United States Patent [19]

MacMillan et al.

[11] Patent Number: 4,773,189

[45] Date of Patent: Sep. 27, 1988

[54] SEPARATION SYSTEM FOR POLYMERIC BLAST MEDIA

[76] Inventors: Gregory D. MacMillan, 22016 S.E. 29th, Issaquah, Wash. 98027; Robert G. Jenzen, 801 N. 32nd, Renton, Wash. 98056

[21] Appl. No.: 59,174

[22] Filed: Jun. 11, 1987

Related U.S. Application Data

[63] Continuation of Ser. No. 794,124, Nov. 1, 1985, abandoned.

[51] Int. Cl.[4] .............................................. B24C 9/00
[52] U.S. Cl. .......................................... 51/425; 51/410
[58] Field of Search ................. 51/424, 425, 436, 410, 51/426, 319–320

[56] References Cited

U.S. PATENT DOCUMENTS

| | | | |
|---|---|---|---|
| 584,021 | 6/1897 | Tilghman, Jr. | 51/425 |
| 2,770,924 | 11/1956 | Mead, et al. | 51/425 |
| 2,935,820 | 5/1960 | Mead | 51/426 |
| 3,716,946 | 2/1973 | Graf | 51/425 |
| 3,857,201 | 12/1974 | Jacob | 51/410 |
| 4,232,487 | 11/1980 | Brown | 51/425 |
| 4,562,791 | 1/1986 | Porter, et al. | 118/326 |

Primary Examiner—Frederick R. Schmidt
Assistant Examiner—Robert A. Rose
Attorney, Agent, or Firm—Seed and Berry

[57] ABSTRACT

A process and apparatus is described for recovering and cleaning for reuse a lightweight blast media typically a polymeric material that is employed as a gas and entrained abrasive for cleaning workpiece surfaces of dirt, corrosion scale, paint or the like. The process involves reentraining the contaminated abrasive material in a gas stream from the worksite. The entrained material was directed in to a separator which separates the abrasives and heavier contaminants from the gas stream by impinging onto a target. Heavier material cascades from the target into the separator collection zone while the lightweight contaminants are swept from the separation zone by means of a vacuum system. The contaminated abrasive media is further cleaned by separating blast media of acceptable size from oversize and finer contaminants, by means of triple screening. The blast media, subjected to a series of separators, achieves a finished product having a 3–5% contaminant content. The process and apparatus of the invention are particularly suitable for recovering polymeric blast media.

8 Claims, 2 Drawing Sheets

SEPARATION SYSTEM FOR POLYMERIC BLAST MEDIA

This application is a continuation of U.S. patent application Ser. No. 794,124, filed Nov. 1, 1985, now abandoned.

TECHNICAL FIELD

The invention relates to processes and apparatus for blast cleaning of workpiece surfaces to remove dirt, corrosion scale and the like. More particularly of interest is recovering and cleaning blast media for reuse.

BACKGROUND ART

In recent years, lightweight polymeric blast media have replaced agricultural products, such as walnut shells, apricot pits and the like, for use in blast cleaning of sensitive workpieces. The polymeric blast material is more consistent in its cutting qualities, as well as inert to degradation by environmental factors.

Polymeric blast media are relatively expensive and, in general, must be recovered for reuse. The cleanliness of the abrasive material, however, needs to be precisely controlled where the workpieces to be cleaned include surface tolerances that are critical and the integrity of the substrate cannot be compromised.

Where the blast cleaning operation is directed to relatively small articles and workpieces that can be blasted within a confining apparatus, such recovery for reuse is not difficult. However, where the workpiece to be cleaned is of large size, such as an airplane, the blast media must first be recovered from the work site before it can be cleaned and recycled.

After collection of the blast media from the work site, contamination such as paint flakes, corrosion particles and dirt must be separated from the polymeric media. The contaminants include large and fine material about the same weight as the blast media. Also present are fines and dusts that are lighter in weight than the blast media.

DISCLOSURE OF THE INVENTION

It is an object of the invention to provide a system and process for recovering and cleaning for reuse a lightweight blast media, typically polymeric, that is employed as a gas-entrained abrasive for cleaning workpiece surfaces of dirt, corrosion scale and the like.

The process and apparatus of recovering the lightweight media from a job site entails, first of all, re-entraining the contaminated abrasive material in a gas stream. The entrained contaminated abrasive media are directed into a separator which separates the abrasives and the heavier portion of contaminants from the gas stream by impinging the gas stream onto a target. The target causes a reversal of gas flow and absorbs sufficient momentum of the heavier contaminats and the abrasive material, wherein this relatively heavier material cascades downwards from the target while the lightweight fines material remains entrained in the gas stream.

The lightweight fines contaminants and dust remaining in suspension in the gas stream are swept from the separator in a manner which imparts suffcient swirl and turbulance to the gas stream to sweep the lightweight contaminants from the interior of the separator and from the cascading contaminated media. The falling contaminated abrasive material is collected at the base of the separator. It may then be re-entrained in a gas stream for a series of air washings similar to the first.

In a preferred system, a separator discharges the heavier fraction of the abrasive media and contaminants onto a screen system for further cleaning. The screens reject particles larger than the polymeric abrasive media, allowing the heavier fraction of the fines to pass through the screen system to waste, and accept that fraction of particles which are equivalent to the average blast media size range. The accepts fraction may be subjected to a succeeding air wash cleaning before dropping into a hopper for reuse.

The system for recovering and cleaning the polymeric blast media for reuse includes a first vacuum system for re-entraining the spent, contaminated abrasive into a gas stream from a blast work site. The entrained media are directed into a closed-top separator tank designed to separate the lightweight fines portion of the contaminants from the abrasive media material and heavier contaminants. The tank includes a bottom discharge from which accepted material is discharged for further cleaning or to a storage hopper for reuse.

The closed top of the separator includes a first closed-end cylinder of smaller diameter than the tank, open to the tank interior at its bottom, wherein the closed end is a target for receiving the gas stream in which the contaminated abrasive blast media material is entrained. The target cylinder causes a reversal of the impacting stream, wherein the abrasives and heavier contaminants cascade to the bottom discharge of the tank while the lightweight fines, contaminants and dust remain in suspension in the gas stream. The top of the separator tank includes a second closed-end cylinder of smaller diameter than the tank, said cylinder open to the tank interior at its bottom and having a sidewall tangential discharge for discharging the fines-contaminated gas stream exiting the separator interior. A second vacuum system evacuates the separator tank interior through the second closed-end cylinder in a manner that causes the airstream to swirl through the cascading heavier abrasives and contaminants falling to the bottom of the tank, sweeping the lightweight fines from the media and separator interior.

The system includes a series of screens for removing contaminants from the blast media by size. A first screen removes oversized contaminants greater than 30 mesh. Smaller fines than 80 mesh pass to waste also. Those materials retained on an 80-mesh screen are substantially the cleaned, lightweight polymeric blast media. The media may then either be directed for reuse or subjected to a polishing separator similar to the first air wash separator. The resulting 95-97% pure polymeric blast media are then suitable for reuse.

BEST MODE FOR CARRYING OUT THE INVENTION

Figure 1:
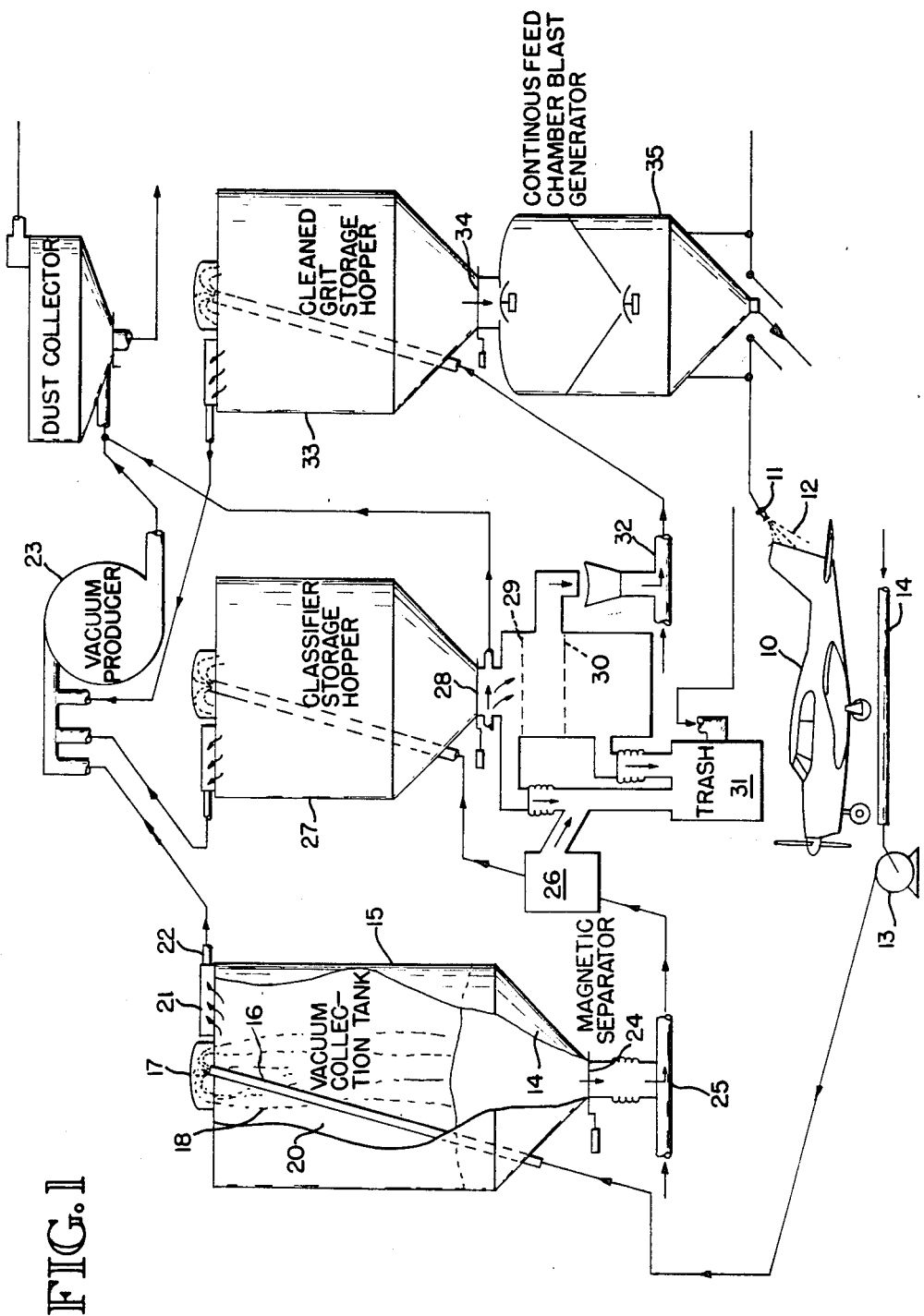
FIG. 1 is a schematic drawing showing the recovery and cleaning system of the invention.
Figure 2:
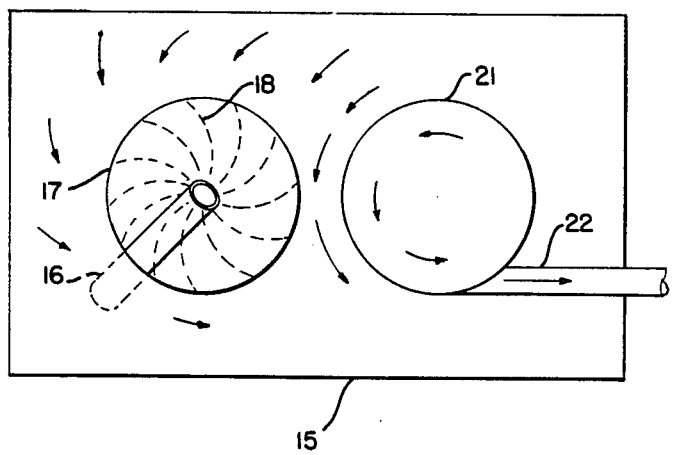
FIG. 2 is a schematic drawing showing a plan view of the separator tank, including the first and second closed-end cylinders and the air currents generated interior to the separator by evacuation of fines contaminants.

Referring to FIGS. 1 and 2, the system of the invention is shown in schematic detail. A workpiece which, in the illustrated case, is an airplane 10, is subjected to a blast cleaning operation to remove paint from fuselage surfaces. A nozzle 11 directs a relatively soft polymeric blast-cleaning media 12 of controlled aggressiveness onto the aircraft surfaces. The spent blast media and contaminating debris, such as dirt and paint flakes, fall to the ground about the aircraft. A suction pump 13 enables a workman using a suction line 14 to re-entrain the spent, contaminated blast media. Discharge from pump 13 is directed to a first air wash separator tank 15. Discharge line 16 projects the entrained abrasive particulate and contaminants into a closed-end cylinder 17, which is open at its base into the interior of the separator tank 15. The closed-end cylinder 17 causes the gas stream in which the contaminanted abrasive media are entrained to reverse direction, resulting in the blast media and heavier contaminants 18 cascading into a hopper collection zone 19 of the separator tank 15. The lightweight portion of the contamination, such as dust and light paint flakes, remains suspended in the separation zone 20 of the tank in the free space above the collected material 18.

The lightweight contaminants are evacuated from the tank through a second closed-end cylinder 21, also shown in the plan view in FIG. 2. The second closed-end cylinder 21 includes a sidewall tangential discharge 22 which imparts a swirling motion to the gases in the separator zone 20 to help keep the fines material from settling out anywhere in the separator and to sweep through the cascading accepted material to further remove fines from the tank and cascading media. A second vacuum pump 23 evacuates the separator tank 15 through the tangential discharge 22.

The contaminated blast media 18 accumulate in a pile at the base 19 of the separator tank 15. A discharge gate 24 meters the material into an entrainment system 25. The re-entrained contaminated blast media is directed through a magnetic separator 26, which removes ferrous contaminates, and then is directed into a second separator tank 27, which is substantially of the same design and function as the first separator tank 15. The contaminated blast media from which more fines have been removed now settle in the base of the separator tank 27 for feed through a feed gate 28 into a screening system.

A first screen 29, typically of 30 mesh, rejects oversized contaminants from the contaminated blast media. A second screen 30, typically of 80 mesh, retains blast media and allows heavy fines to pass therethrough to a disposal bin 31. The substantially clean blast media drop into a re-entrainment system 32, which transports the media into a polishing air wash cleaner 33, which, in design and function, is similar to the first separator system 15.

The cleaned blast media are fed through a feed gate 34 into a feed hopper 35. The hopper 35 supplies the blast nozzle 11. At this reuse point, the blast media retains only 3-5% contaminants.

In operation, the blast media are vacuumed from the job site and injected at about 2800 feet per minute into the separator unit 15. The distance from the exit of the injector pipe 16 to the top of the dome of the target cylinder 17 is selected such that, in combination with the gas stream velocity and character of the blast material, the blast material drops from the entrainment gas in a substantially uniformly distributed curtain cascading downward to the collection zone 19.

A preferred polymeric blast media is an amino-base thermoset resin, Polyplus ™, manufactured by U.S. Plastic and Chemical Corporation of Putnam, Conn. The blast media material has a bulk density of 58-60 pounds per cubic foot and is discharged at 2800 feet per minute into the first closed cylinder, which is 20 inches in diameter. The separator tank of such a system is 60 inches in diameter.

In this preferred system, the second vacuum pump 23 exerts a 13-15 inch Hg vacuum on the separator tanks generating less than 2800 feet per minute exiting fines-contaminated gas streams.

With the Polyplus ™ blast media, the screen system for removing heavy oversize and fines is designed to recover a 30-80 mesh particle size range.

In a preferred operation, the entrained, contaminated blast media is injected into the first closed-end cylinder with a velocity such that abrasive media material does not impact the top of the closed-end cylinder. The object is to have the blast media lose momentum under the influence of gravity and gas resistance therein to cascade downward in a uniform curtain, avoiding agglomeration, so that the falling material can be subjected to the swirling, exiting gas stream, sweeping the dust and light contaminants from the cascading material. The exiting gas stream is limited in velocity so that none of the polymeric blast media exit with the fines. There must be sufficient velocity so that none of the dust settles out or accumulates inside the separator.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A system for recovering and cleaning for reuse a contaminated lightweight material employed as a gas-entrained abrasive for cleaning workpiece surfaces of contaminants such as dirt, corrosion, scale and the like, where the abrasive has a specific gravity less than the heavier contaminants and greater than the lightweight contaminants combined therewith as a result of the cleaning operation, comprising:

a first vacuum system for re-entraining spent, contaminated abrasive into a transporting gas stream from a work site, said first vacuum system discharging the gas stream in a generally vertical direction;

a closed-top separator tank including a bottom portion for collection and discharge of said abrasive and an upper portion, said upper portion including:

a first closed-end cylinder including a target surface toward which said gas stream containing the contaminated abrasive is directed upon discharge from said first vacuum system, said first closed-end cylinder having a shape to cause a disbursal and general reversal in direction of travel of the abrasive and contaminants, said first closed-end cylinder including a substantially unrestricted bottom discharge opening through which the abrasive and contaminants fall downwardly at a substantially reduced speed of travel toward said bottom portion of said separator tank with the lightweight abrasive and contaminants therein remaining substantially suspended while the bulk of the abrasive and heavier contaminants travel to said bottom portion of said separator tank for removal; and a second closed-end cylinder of smaller diameter than said separator tank, said second cylinder having an opening open to said tank upper portion interior at its bottom at a position lateral of said first closed-end cylinder opening communicating with a substantially dead air space of said separator tank and having a sidewall tangential discharge for discharging said gas stream contaminated with lightweight contaminants from the upper portion of said separator tank interior, said second cylinder opening being out of direct path of the falling bulk of the abrasive and heavier contaminants to capture the suspended lightweight contaminants and lightweight abrasive particles; and a second vacuum system for evacuating said separator tank through said second cylinder tangential exit, wherein a gentle swirling motion is imparted to the lightweight abrasive particles and contaminants throughout said separator upper portion by operation of the second cylinder tangential discharge, such that said exiting gas sweeps the lightweight contaminants from the cascading heavier abrasives falling to the bottom of the tank, and said abrasives, cleaned of said lightweight contaminants are discharged from said tank bottom discharge.

2. The recovery and cleaning system of claim 1 wherein said contaminated gas stream is injected substantially vertically into said impact target at a velocity wherein all material as heavy as clean abrasive material cascades downward from said impact target into the bottom portion of said separator.

3. The recovery and cleaning system of claim 1, further including a dust collector for receiving the fines-contaminated gas stream exiting said second cylinder tangential discharge and removing said fines from said gas stream.

4. The recovery and cleaning system of claim 1, including a screen for receiving the heavier abrasive material discharging from said tank bottom discharge, said screen removing contaminating debris larger than said abrasive material.

5. The recovery and cleaning system of claim 4 wherein said screen removes material greater in size than 30 mesh from said contaminated abrasive material.

6. The recovery and cleaning system of claim 5 wherein said screen retains abrasive material of greater than 80 mesh for reuse in abrasive cleaning and permits finer debris and heavy fines to pass therethrough for disposal.

7. The recovery and cleaning system of claim 4 wherein a magnetic separator for removing ferrous contaminating debris is included prior to said screen.

8. The recovery and cleaning system of claim 1 wherein said lightweight contaminant separator system includes a plurality of such separators, in series, wherein the bottom discharge of each separator, except the last separator, is connected to a vacuum system for re-entraining said partially cleaned material in a gas stream which is then directed into a first target cylinder of the subsequent tank, said last tank having a bottom discharge discharging clean abrasive material into a hopper for reuse in abrasive cleaning.

* * * * *